(12) United States Patent
Smith

(10) Patent No.: US 11,445,656 B2
(45) Date of Patent: Sep. 20, 2022

(54) SYSTEM AND METHOD FOR PREVENTING MATERIAL ACCUMULATION RELATIVE TO GROUND ENGAGING TOOLS OF AN AGRICULTURAL IMPLEMENT

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 302 days.

(21) Appl. No.: 16/696,287

(22) Filed: Nov. 26, 2019

(65) Prior Publication Data

US 2021/0153420 A1    May 27, 2021

(51) Int. Cl.
*A01B 79/00* (2006.01)
*A01B 63/24* (2006.01)
*A01B 49/02* (2006.01)

(52) U.S. Cl.
CPC .......... *A01B 79/005* (2013.01); *A01B 63/24* (2013.01); *A01B 49/027* (2013.01)

(58) Field of Classification Search
CPC .......... A01B 79/005; A01B 63/24–32; A01B 49/027
See application file for complete search history.

(56) References Cited

U.S. PATENT DOCUMENTS

| | | | | |
|---|---|---|---|---|
| 4,463,811 A | * | 8/1984 | Winter ............... | A01B 69/004 172/26 |
| 4,930,581 A | * | 6/1990 | Fleischer et al. .... | A01B 69/004 172/191 |
| 5,031,704 A | * | 7/1991 | Fleischer et al. .... | A01B 69/004 172/6 |
| 5,392,863 A | * | 2/1995 | Fixemer ............. | A01B 69/004 172/26 |
| 5,462,123 A | * | 10/1995 | Harlan et al. ........ | A01B 63/32 172/454 |
| 5,673,637 A | * | 10/1997 | Colburn, Jr. et al. ...... A01B 79/005 111/118 |

(Continued)

FOREIGN PATENT DOCUMENTS

| | | | | |
|---|---|---|---|---|
| CA | 3046760 A1 | * | 2/2020 | .......... A01C 21/007 |
| DE | 102005005557 | | 2/2016 | |
| WO | WO-2017049186 A1 | * | 3/2017 | ............ A01B 49/06 |

*Primary Examiner* — Tara Mayo-Pinnock
(74) *Attorney, Agent, or Firm* — Rebecca L. Henkel; Rickard K. DeMille

(57) ABSTRACT

A system for preventing material accumulation relative to an agricultural implement may include a ground engaging tool supported on an agricultural implement and a controller configured to determine a presence of excessive residue across a forward portion of the field forward of the ground engaging tool based at least in part residue data associated with an amount of residue across a forward portion of the field. The controller may initiate a control action associated with adjusting an operating parameter of the ground engaging tool such that the amount of residue incorporated into the field by the ground engaging tool is reduced across a section of the field having excessive residue to reduce a likelihood of material accumulation relative to the ground engaging tool as it passes across the section of the field.

20 Claims, 3 Drawing Sheets

(56) References Cited

U.S. PATENT DOCUMENTS

| | | | |
|---|---|---|---|
| 5,813,472 A * | 9/1998 | Fixemer | A01B 69/004 172/26 |
| 6,138,590 A * | 10/2000 | Colburn, Jr. | A01B 79/005 111/118 |
| 6,553,925 B1 * | 4/2003 | Beaujot | A01B 69/004 111/14 |
| 6,853,937 B2 | 2/2005 | Shibusawa | |
| 6,883,299 B1 * | 4/2005 | Gramm | A01D 41/06 172/4 |
| 8,408,149 B2 | 4/2013 | Rylander | |
| 9,554,098 B2 | 1/2017 | Casper et al. | |
| 9,807,933 B2 * | 11/2017 | Boyd et al. | A01D 41/127 |
| 10,123,475 B2 | 11/2018 | Posselius et al. | |
| 10,255,670 B1 * | 4/2019 | Wu et al. | H04N 7/183 |
| 2012/0048160 A1 * | 3/2012 | Adams et al. | A01C 5/066 111/163 |
| 2015/0040528 A1 * | 2/2015 | Grotelueschen et al. | A01D 46/08 56/10.1 |
| 2015/0296701 A1 * | 10/2015 | Anderson | A01B 79/00 172/2 |
| 2016/0029547 A1 | 2/2016 | Casper et al. | |
| 2016/0029561 A1 | 2/2016 | Fischer | |
| 2017/0079190 A1 * | 3/2017 | Steinlage et al. | A01B 19/04 |
| 2017/0112043 A1 | 4/2017 | Nair et al. | |
| 2018/0049361 A1 * | 2/2018 | Zemenchik | A01B 49/027 |
| 2018/0092295 A1 * | 4/2018 | Sugumaran et al. | A01C 23/007 |
| 2018/0108123 A1 | 4/2018 | Baurer | |
| 2018/0114305 A1 * | 4/2018 | Strnad et al. | G06T 7/001 |
| 2018/0174291 A1 | 6/2018 | Asada et al. | |
| 2018/0210450 A1 | 7/2018 | Ferrari et al. | |
| 2018/0336410 A1 | 11/2018 | Posselius | |
| 2018/0352718 A1 * | 12/2018 | Kovach et al. | A01B 49/027 |
| 2019/0000011 A1 * | 1/2019 | Gervais et al. | A01C 7/102 |
| 2019/0387658 A1 * | 12/2019 | Henry | A01B 76/00 |
| 2020/0084954 A1 * | 3/2020 | Sporrer et al. | A01B 63/32 |
| 2020/0100420 A1 * | 4/2020 | Sporrer et al. | A01B 63/16 |

\* cited by examiner

SYSTEM AND METHOD FOR PREVENTING MATERIAL ACCUMULATION RELATIVE TO GROUND ENGAGING TOOLS OF AN AGRICULTURAL IMPLEMENT

FIELD OF THE INVENTION

The present disclosure relates generally to plugging or material accumulation and, more particularly, to systems and methods for preventing material accumulation relative to ground engaging tools of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow disks, leveling disks, rolling baskets, shanks, tines, and/or the like. Such ground engaging tool(s) loosen and/or otherwise agitate the soil to prepare the field for subsequent planting operations.

During tillage operations, field materials, such as residue, soil, rocks, and/or the like, may become trapped or otherwise accumulate on or between ground engaging tools. Such accumulations of field materials may inhibit the operation of the ground engaging tools in a manner that prevents the tools from providing adequate tillage to the field. In such instances, it is necessary for the operator to take certain corrective actions to remove the material accumulation. However, such corrective actions may be time consuming and may negatively affect the performance of the tillage implement for longer than desired.

Accordingly, an improved system and related method for preventing material accumulation relative to ground engaging tools of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for preventing material accumulation relative to an agricultural implement. The system includes a ground engaging tool supported on an agricultural implement, with the ground engaging tool having an operating parameter that is adjustable to vary an amount of residue incorporated into a field by the ground engaging tool during the performance of an agricultural operation within the field. Additionally, the system includes a controller communicatively coupled to the residue sensor. The controller is configured to receive residue data associated with an amount of residue across a forward portion of the field forward of the ground engaging tool along a direction of travel of the agricultural implement. The controller is further configured to determine a presence of excessive residue across the forward portion of the field based at least in part on the residue data. Additionally, the controller is configured to initiate a control action associated with adjusting the operating parameter of the ground engaging tool in a manner designed to reduce a likelihood of material accumulation relative to the ground engaging tool as it passes across a section of the field having excessive residue. Particularly, the operating parameter is adjusted such that the amount of residue incorporated into the field by the ground engaging tool is reduced across the section of the field having excessive residue.

In another aspect, the present subject matter is directed to a method for preventing material accumulation relative to an agricultural implement. The method includes performing an agricultural operation within a field with a ground engaging tool of an agricultural implement. The ground engaging tool has an operating parameter that is adjustable to vary an amount of residue incorporated into the field by the ground engaging tool during the agricultural operation. The method further includes receiving, with a computing device, residue data indicative of an amount of residue across a forward portion of the field forward of the ground engaging tool along a direction of travel of the agricultural implement. Moreover, the method includes determining, with the computing device, a presence of excessive residue across the forward portion of the field based at least in part on the residue data. Additionally, the method includes initiating, with the computing device, a control action associated with adjusting the operating parameter of the ground engaging tool in a manner designed to reduce a likelihood of material accumulation relative to the ground engaging tool as it passes across a section of the field having excessive residue. Particularly, the operating parameter is adjusted such that the amount of residue incorporated into the field by the ground engaging tool is reduced across the section of the field having excessive residue.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
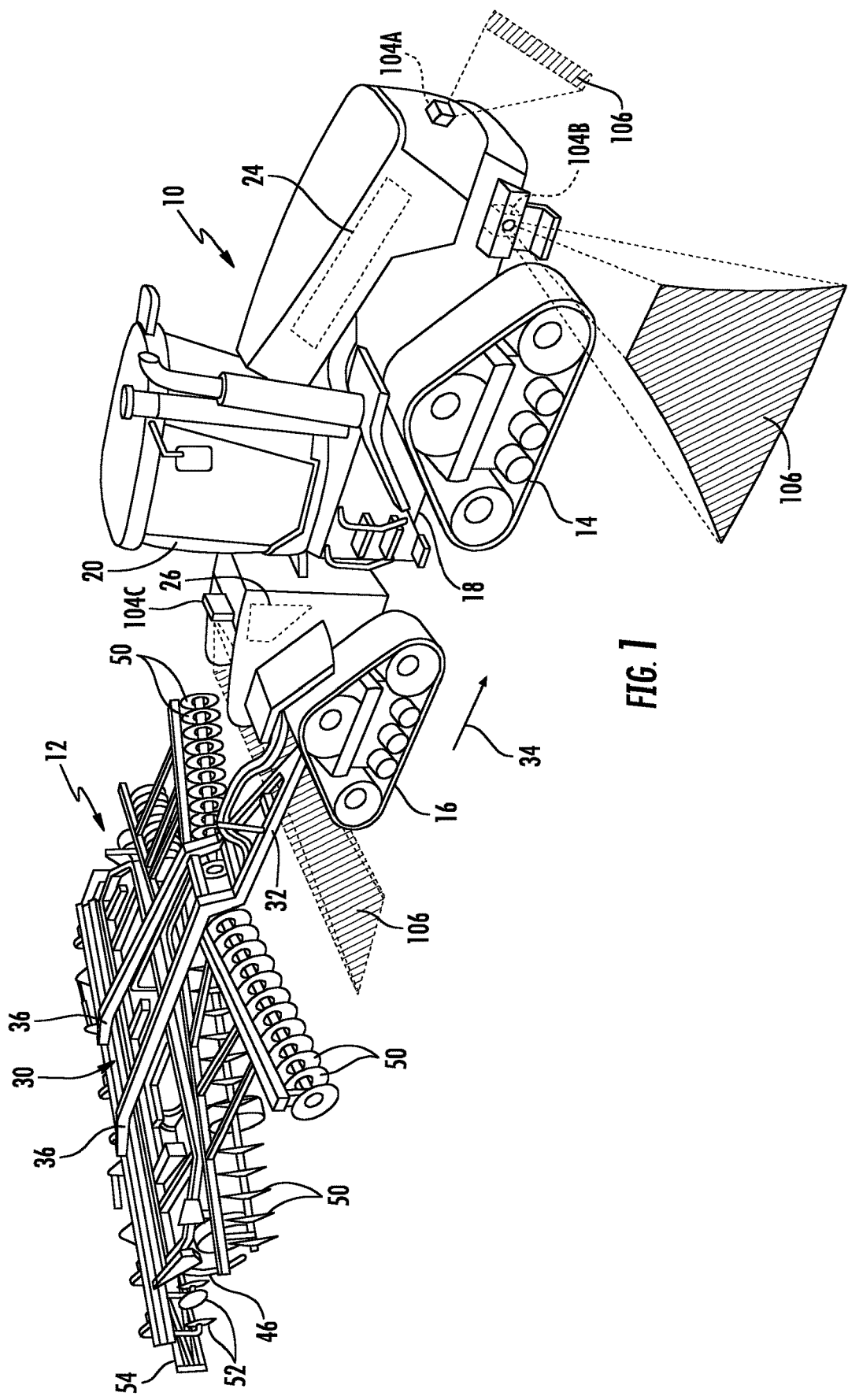
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for preventing material accumulation relative to ground engaging tools of an agricultural implement. Specifically, in several embodiments, a controller of the disclosed system may be configured to receive residue data indicative of an amount of residue within the field forward of the implement as the implement is being moved across a field. Typically, areas of a field with less residue are less likely to cause plugging or material accumulation relative to ground engaging tools than areas of a field with excessive residue. As such, in accordance with aspects of the present subject matter, the controller may be configured to monitor the residue data to determine when excessive residue is present. For instance, in one embodiment, the controller may determine the presence of excessive residue across the forward portion of the field when a percentage of residue coverage across the forward portion of the field exceeds a threshold residue percentage. In some embodiments, the controller may determine the presence of excessive residue across the forward portion of the field when a height of the residue across the field exceeds a threshold height.

Once it is determined that excessive residue is present within the forward portion of the field, the controller may perform one or more control actions to prevent the ground engaging tools from becoming plugged as they cross a section of the field determined to have excessive residue. For example, the controller may be configured to indicate the presence of excessive residue (e.g., via a user interface) to the operator and/or adjust the operation of the implement, such as by adjusting the penetration depth, the engagement angle, and/or the speed of the ground engaging tools. Such adjustments to the operation of the implement may reduce the likelihood of plugging of the ground engaging tools by reducing the amount or period of contact between the ground engaging tools and the residue. Such adjustments may also reduce the effectiveness of the ground engaging tools in incorporating residue into the soil, however, such reduction in the performance of the agricultural implement may still be more beneficial to the overall quality and time of the agricultural operation than if the ground engaging tools were to become plugged.

Figure 2:
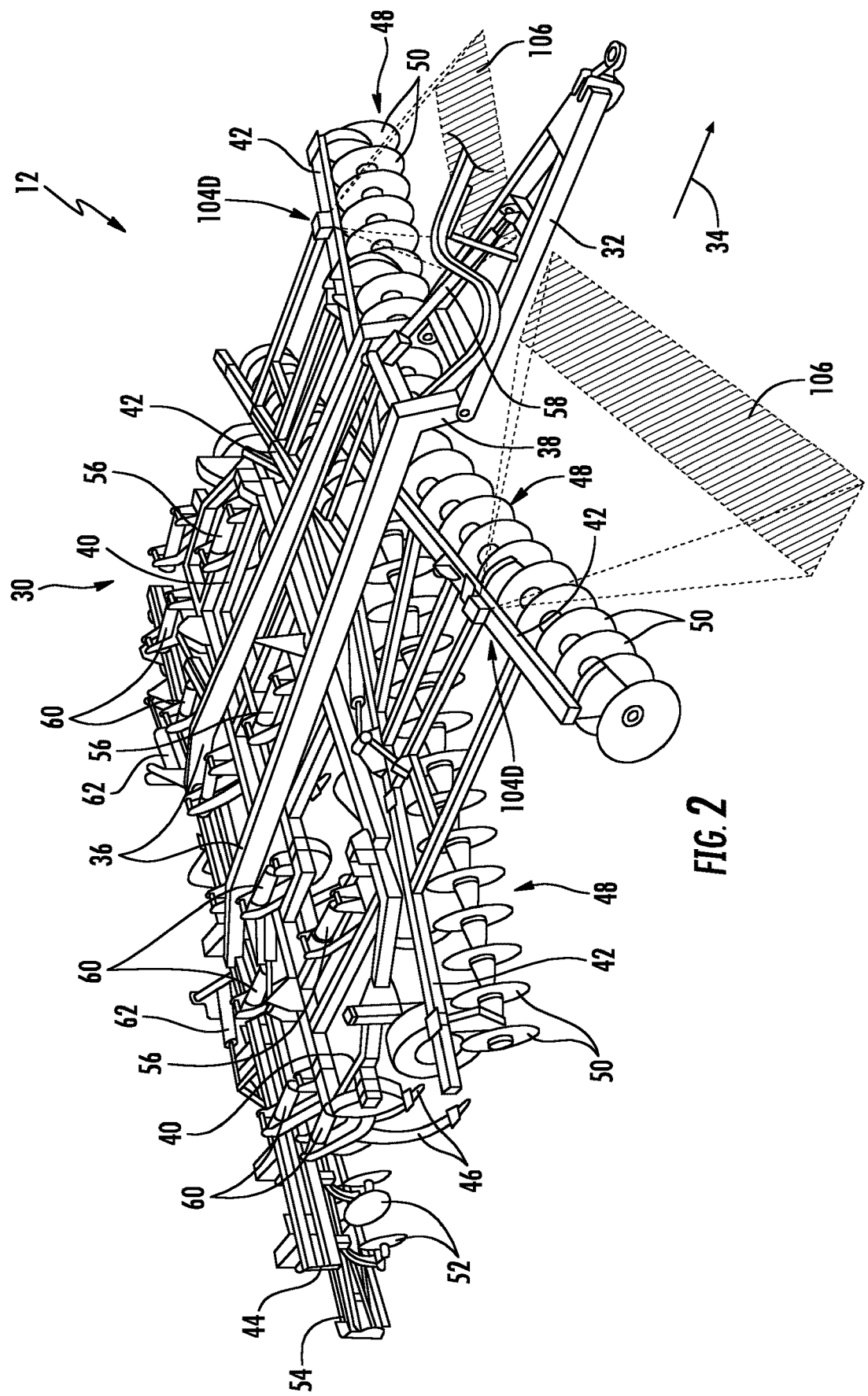
FIG. 2 illustrates another perspective view of the agricultural implement shown in FIG. 1 in accordance with aspects of the present subject matter, particularly illustrating various ground engaging tools and/or assemblies of the implement.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the implement 12 (e.g., across a field). Additionally, FIG. 2 illustrates a perspective view of the implement 12 shown in FIG. 1. As shown in the illustrated embodiment, the work vehicle 10 is configured as an agricultural tractor. However, in other embodiments, the work vehicle 10 may be configured as any other suitable agricultural vehicle.

As particularly shown in FIG. 1, the work vehicle 10 includes a pair of front track assemblies 14, a pair or rear track assemblies 16 and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, as is generally understood, the work vehicle 10 may include an engine 24 and a transmission 26 mounted on the chassis 18. The transmission 26 may be operably coupled to the engine 24 and may provide variably adjusted gear ratios for transferring engine power to the track assemblies 14, 16 via a drive axle assembly (not shown) (or via axles if multiple drive axles are employed).

Moreover, as shown in FIGS. 1 and 2, the implement 12 may generally include a carriage frame assembly 30 configured to be towed by the work vehicle via a pull hitch or tow bar 32 in a travel direction of the vehicle (e.g., as indicated by arrow 34). As is generally understood, the carriage frame assembly 30 may be configured to support a plurality of ground-engaging tools, such as a plurality of shanks, disk blades, leveling blades, basket assemblies, and/or the like. In several embodiments, the various ground-engaging tools may be configured to perform a tillage operation across the field along which the implement 12 is being towed.

As particularly shown in FIG. 2, the carriage frame assembly 30 may include aft extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally function to support a central frame 40, a forward frame 42 positioned forward of the central frame 40 in the direction of travel 34 of the work vehicle 10, and an aft frame 44 positioned aft of the central frame 40 in the direction of travel 34 of the work vehicle 10. As shown in FIG. 2, in one embodiment, the central frame 40 may correspond to a shank frame configured to support a plurality of ground-engaging shanks 46. In such an embodiment, the shanks 46 may be configured to till the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10 to promote more effective tilling of the soil. However, in other embodiments, the forward frame 42 may be configured to support any other suitable ground-engaging tools.

Moreover, similar to the central and forward frames 40, 42, the aft frame 44 may also be configured to support a plurality of ground-engaging tools. For instance, in the illustrated embodiment, the aft frame is configured to support a plurality of leveling blades 52 and rolling (or crumbler) basket assemblies 54. However, in other embodiments, any other suitable ground-engaging tools may be coupled to and supported by the aft frame 44, such as a plurality closing disks.

In addition, the implement 12 may also include any number of suitable actuators (e.g., hydraulic cylinders) for adjusting the relative positioning, engagement angle, penetration depth, and/or down force associated with the various ground-engaging tools 46, 58, 52, 54. For instance, the implement 12 may include one or more shank actuators 56 coupled to the central frame 40 for raising or lowering the central frame 40 relative to the ground, thereby allowing the penetration depth of the shanks 46 to be adjusted. Similarly, the implement 12 may include one or more disk actuators 58 coupled to the disk forward frame 42 to adjust the penetration depth of the disk blades 50. Moreover, the implement 12 may include one or more aft frame actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the down pressure and/or the penetration depth) to be adjusted. Further, the implement 12 may include one or more basket actuators 62 coupled to the baskets 54 to adjust the down pressure of the baskets 54. Additionally, the implement 12 may include one or more disk angle actuators 64 (FIG. 3) coupled to respective disk gangs 48 to allow the disk gangs 48 to be pivoted relative to the central frame 40, thereby allowing the engagement angle of the disk gangs 48 to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10, or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing closing disks on the aft frame 44 of the implement 12.

Additionally, in accordance with aspects of the present subject matter, the work vehicle 10 and/or the implement 12 may include one or more residue sensors coupled thereto and/or supported thereon for capturing residue data associated with the amount of residue across the field as an operation is being performed via the implement 12. Specifically, in several embodiments, the residue sensor(s) may be provided in operative association with the work vehicle 10 such that the residue sensor(s) have a field of view directed towards a portion(s) of the field disposed in front of, behind, and/or along one or both of the sides of the work vehicle 10 and/or in operative association with the implement 12 such that the residue sensor(s) have a field of view directed towards a portion(s) of the field disposed in front of the implement 12 as the implement 12 is being towed across the field. As such, the residue sensor(s) may capture residue data of one or more portion(s) of the field being passed by the tractor 10 and/or in front of the implement 12.

In general, the residue sensor(s) may correspond to any suitable device(s) configured to capture residue data of the field that allow the amount of residue across the field's surface to be detected. For instance, in several embodiments, the residue sensor(s) may correspond to any suitable camera (s) (including stereo camera(s), and/or the like), LIDAR sensor(s), other laser-based sensor(s), distance sensor(s), and/or the like.

It should be appreciated that work vehicle 10 and/or implement 12 may include any number of residue sensor(s) 104 provided at any suitable location that allows residue data to be captured as the vehicle 10 and implement 12 traverse through the field. For instance, FIGS. 1 and 2 illustrate examples of various locations for mounting one or more residue sensor(s) for capturing residue data of the portion of the field in front of the implement 12.

Specifically, as shown in FIG. 1, in one embodiment, one or more residue sensors 104A may be coupled to the front of the work vehicle 10 such that the residue sensor(s) 104A has a field of view 106 that allows it to capture residue data of an adjacent area or portion of the field disposed in front of the work vehicle 10, and thus, in front of the implement 12. For instance, the field of view 106 of the residue sensor(s) 104A may be directed outwardly from the front of the work vehicle 10 along a plane or reference line that extends generally parallel to the travel direction 34 of the work vehicle 10. In addition to such residue sensor(s) 104A (or as an alternative thereto), one or more residue sensors 104B may also be coupled to one of the sides of the work vehicle 10 such that the residue sensor(s) 104B has a field of view 106 that allows it to capture residue data within an adjacent area or portion of the field disposed along such side of the work vehicle 10 and in front of the implement 12. For instance, the field of view 106 of the residue sensor(s) 104B may be directed outwardly from the side of the work vehicle 10 along a plane or reference line that extends generally perpendicular to the travel direction 34 of the work vehicle 10. Similarly, in one embodiment, one or more residue sensors 104C may be coupled to the rear of the work vehicle 10 such that the residue sensor(s) 104C has a field of view 106 that allows it to capture residue data of an adjacent area or portion of the field disposed aft of the work vehicle 10 and in front of the implement 12. For instance, the field of view 106 of the residue sensor(s) 104C may be directed outwardly from the rear of the work vehicle 10 along a plane or reference line that extends generally parallel to the travel direction 34 of the work vehicle 10.

In addition to such residue sensor(s) 104A, 104B, 104C (or as an alternative thereto), one or more residue sensors 104D may also be coupled to the front of the implement 12 such that the residue sensor(s) 104D has a field of view 106 that allows it to capture residue data of an adjacent area or portion of the field disposed in front of the implement 12. For instance, the field of view 106 of the residue sensor(s) 104D may be directed outwardly from the front of the implement 12 along a plane or reference line that extends generally perpendicular to the travel direction 34 of the work vehicle 10.

It should be appreciated that, in alternative embodiments, the residue sensor(s) 104 may be installed at any other suitable location that allows the device(s) to capture residue data of a portion of the field forward of the implement 12.

As will be described below in greater detail, in one embodiment, the residue data collected by the residue sensor (s) 104 may be used to determine the amount of residue across the portion of the field forward of the implement 12 (e.g., within the field(s) of view 106). Alternatively, or additionally, the residue data may be accessed from a residue map generated during a previous field operation based on a position of the implement 12. If an excessive amount of residue is present across such forward portion of the field, the ground engaging tools of the implement 12 are more likely to become plugged. As such, one or more operating parameters of the ground engaging tools of the implement 12 may be adjusted to reduce the likelihood of plugging or excessive material accumulation relative as the tools work or pass over the section of the field indicated to have excessive residue (e.g., the section of the field that previously passed through the field of view 106). Particularly, the operating parameter(s) may be adjusted such that the ground engaging tools have less contact with or less ability to work the residue across the section of the field having excessive residue, which reduces the likelihood of plugging of the ground engaging tools. This also means that amount of residue incorporated into the field by the ground engaging tools is reduced across the section of the field having the presence of excessive residue. As such, the likelihood of plugging of the ground engaging tools may be reduced by reducing the effectiveness of the tillage operation of the implement in areas with excessive residue.

Figure 3:
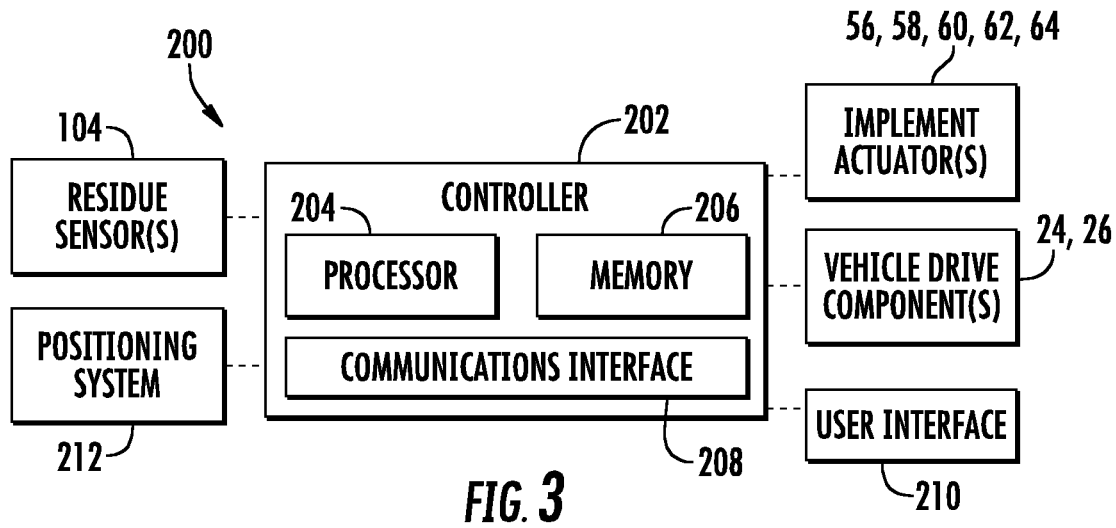
FIG. 3 illustrates a schematic view of one embodiment of a system for preventing material accumulation relative to ground engaging tools of an agricultural implement in accordance with aspects of the present subject matter.

Referring now to FIG. 3, a schematic view of one embodiment of a system 200 for preventing material accumulation relative to ground engaging tools of an agricultural implement is illustrated in accordance with aspects of the present subject matter. In general, the system 200 will be described herein with reference to the work vehicle 10, the implement 12, and the residue sensor(s) 104 described above with reference to FIGS. 1 and 2. However, it should be appreciated by those of ordinary skill in the art that the disclosed system 200 may generally be utilized with work vehicles having any other suitable vehicle configuration, agricultural implements having any other suitable implement configuration, and/or with ground engaging assemblies/tools having any other suitable assembly/tool configuration.

As shown in FIG. 3, the system 200 may include a controller 202 configured to electronically control the operation of one or more components of the work vehicle 10 and/or the agricultural implement 12. In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

It should be appreciated that, in several embodiments, the controller 202 may correspond to an existing controller of the agricultural implement 12 and/or the work vehicle 10 to which the implement 12 is coupled. However, it should be appreciated that, in other embodiments, the controller 202 may instead correspond to a separate processing device. For instance, in one embodiment, the controller 202 may form all or part of a separate plug-in module that may be installed within the agricultural implement 12 and/or the work vehicle 10 to allow for the disclosed system and method to be implemented without requiring additional software to be uploaded onto existing control devices of the agricultural implement 12 and/or the work vehicle 10.

In some embodiments, the controller 202 may be configured to include a communications module or interface 208 to allow for the controller 202 to communicate with any of the various other system components described herein. For instance, the controller 202 may, in several embodiments, be configured to receive data inputs from one or more sensors of the agricultural implement 12 that are used to detect one or more parameters associated with excessive residue across a portion of the field forward of the implement 12. Particularly, the controller 202 may be in communication with one or more sensors configured to detect parameters indicative of the presence of excessive residue across a forward portion of the field. For instance, the controller 202 may be communicatively coupled to one or more residue sensor(s) 104 via any suitable connection, such as a wired or wireless connection, to allow data indicative of excessive residue within the forward portion of the field to be transmitted from the residue sensor(s) 104 to the controller 202.

Specifically, referring back to FIGS. 1 and 2, one or more residue sensors 104 may be installed or otherwise positioned relative to the work vehicle 10 or the implement 12 to capture residue data indicative of an amount of residue across a portion of the field forward of the implement 12 along the direction of travel 34, which in turn, is indicative of the likelihood that the residue will cause material accumulation or plugging relative to the ground engaging tools of the implement 12. Thus, in several embodiments, the controller 202 may be configured to determine the amount of residue across the forward portion of the field relative to the implement 12 based on the residue data received from the sensor(s) 104. For example, the controller 202 may include one or more algorithms stored within its memory 206 that, when executed by the processor 204, allow the controller 202 to infer or estimate the amount of residue across the forward portion of the field based at least in part on the data received from the sensor(s) 104.

In some embodiments, the controller 202 may additionally or alternatively be configured to access a residue map generated during a previous field operation indicative of an amount of residue across the field forward of the implement 12. For instance, in some embodiments, the controller 202 may be communicatively coupled to a positioning system 212 (e.g. a GPS system, a Galileo positioning system, the Global Navigation satellite system (GLONASS), the BeiDou Satellite Navigation and Positioning system, and/or the like), with the positioning system 212 being configured to identify the current location of the implement 12. In such an embodiment, the controller 202 may be configured to monitor the current location of the implement 12 with respect to a residue map (e.g., stored in the memory 206 of the controller 202, or otherwise accessible by the controller 202) and determine the amount of residue across the portion of the field forward of the implement 12. As such, in some embodiments, the residue data may correspond to residue data received or accessed from a residue map previously generated.

In some embodiments, the controller 202 may determine a percentage of residue coverage across the forward portion of the field based at least in part on the residue data received from the residue sensor(s) 104 and/or the previously generated residue map. The controller 202 may include one or more algorithms that compare the percentage of residue coverage to a threshold residue percentage to determine the presence of excessive residue across the forward portion of the field. For example, in one embodiment, the threshold residue percentage may generally correspond to a maximum percentage of residue coverage above which the ground engaging tools are likely to become plugged. Thus, the controller 202 may determine the presence of excessive residue across the forward portion of the field when the detected percentage of residue coverage across the forward portion of the field exceeds the threshold residue percentage. It should be appreciated that, in some embodiments, the controller 202 may compare the detected percentage of residue coverage to multiple threshold residue percentages corresponding to varying amounts of residue such that the controller 202 may determine the relative magnitude of the residue coverage across the forward portion of the field. It should further be appreciated that the threshold residue percentage(s) may be selected based on experimental results for different amounts of residue across the forward portion of the field. However, the threshold residue percentage(s) may be selected in any other suitable manner.

Similarly, in some embodiments, the controller 202 may determine a detected height of the residue across the forward portion of the field based at least in part on the residue data. The detected height of the residue may correspond to the greatest height of the residue across the forward portion of the field. It should be appreciated that the height of the residue may be detected by the residue sensor(s) 104 and/or determined from the residue map created during a previous agricultural operation within the field based on the position of the implement 12 within the field, similar to as described above. The controller 202 may include one or more algorithms that compare the height of the residue within the field to a threshold height to determine the presence of excessive residue across the forward portion of the field. For example, in one embodiment, the threshold height may generally correspond to a maximum height of the residue across the forward portion of the field above which the ground engaging tools are likely to become plugged. Thus, the controller 202 may determine the presence of excessive residue across the forward portion of the field when the detected height of the residue across the forward portion of the field exceeds the threshold height. It should be appreciated that, in some embodiments, the controller 202 may compare the detected residue height to multiple threshold heights corresponding to varying heights of residue such that the controller 202 may determine the relative magnitude of the height of the residue across the forward portion of the field. It should further be appreciated that the threshold height(s) may be selected based on experimental results for different heights of residue across the forward portion of the field. However, the threshold height(s) may be selected in any other suitable manner.

The controller 202 may further be configured to perform one or more implement-related control actions based on the residue or height data. Specifically, the controller 202 may be configured to control one or more components of the agricultural implement 12 based on the determination of the presence of excessive residue across the forward portion of the field relative to the ground engaging tools. For example, the controller 202 may be configured to control one or more of the shank actuator(s) 56, the disk actuator(s) 58, the aft frame actuator(s) 60, the basket actuator(s) 62, or the disk angle actuator(s) 64 to adjust an operating parameter of the associated ground engaging tools (e.g., shanks 46, disk gangs 48, leveling disks 52, basket assemblies 54) in a manner designed to reduce the likelihood of material accumulation forming relative thereto as it passes over the section of the field having excessive residue. For instance, the controller 202 may be configured to control one or more of the actuator(s) 56, 58, 60, 62, 64 to adjust the operating parameters from desired operating parameter setting(s), where the operating parameter(s) of the ground engaging tools are set such that a desired amount of residue is left on the field after the ground engaging operation, to reduced operating parameter setting(s), where the operating parameter(s) of the ground engaging tools are set to reduce the likelihood of plugging of the ground engaging tools, over the section(s) of the field having the presence of excessive residue.

For instance, the controller 202 may be configured to control one or more of the actuator(s) 56, 58, 60, 62 to adjust a penetration depth of the associated ground engaging tool(s) 46, 58, 52, 54. Particularly, in one embodiment, the controller 202 may be configured to control one or more of the actuator(s) 56, 58, 60, 62 to decrease the penetration depth of the associated ground engaging tool(s) 46, 58, 52, 54. Similarly, in some embodiments, the controller 202 may be configured to control one or more of the actuator(s) 64 to adjust an engagement angle of the ground engaging tool(s) 48 relative to the direction of travel 34. Particularly, in one embodiment, the controller 202 may be configured to control one or more of the actuator(s) 64 to decrease the engagement angle of the ground engaging tool(s) 48 relative to the direction of travel 34.

By reducing the penetration depth of the ground engaging tool(s) 46, 58, 52, 54 and/or the engagement angle of the ground engaging tool(s) 58, the ground engaging tool(s) may engage residue less and/or for a shorter amount of time, which may reduce the likelihood that the ground engaging tool(s) begins to accumulate residue. Such reduction in the penetration depth and/or the engagement angle of the ground engaging tool(s) may also typically reduce the amount of residue incorporated into the field by the ground engaging tool(s) 46, 58, 52, 54 across the section of the field having excessive residue. The controller 202 may further be configured to control the operation of one or more of the actuator(s) 56, 58, 60, 62, 64 to adjust the operating parameters back from the reduced operating parameter setting(s) to the desired operating parameter setting(s) after working the section(s) of the field having excessive residue.

Further, in some embodiments, the controller 202 may be configured to indicate to an operator the presence of excessive residue across the forward portion of the field. For example, in the embodiment shown in FIG. 3, the communications module 208 may allow the controller 202 to communicate with a user interface 210 having a display device configured to display information regarding the presence of excessive residue (e.g., amount, frequency, duration, patterns, and/or the like) across the forward portion of the field. It should be appreciated that the user interface 210 may be positioned within the cab or may be positioned remotely from the work vehicle 10 and/or implement 12. It should further be appreciated that the controller 202 may instead or additionally be communicatively coupled to any number of other indicators, such as lights, audio devices (e.g., alarms, speakers, etc.), and/or the like to provide an indicator to the operator regarding the presence of excessive residue across the forward portion of the field.

Additionally or alternatively, in some embodiments, the controller 202 may be configured to perform one or more vehicle-related control actions based on the determination of a presence of excessive residue across the forward portion of the field. For example, as shown in FIG. 3, in some embodiments, the controller 202 may be configured to control the operation of one or more vehicle drive components configured to drive the vehicle 10 coupled to the implement 12, such as the engine 24 and/or the transmission 26 of the vehicle 10. In such embodiments, the controller 202 may be configured to control the operation of the vehicle drive component(s) 24, 26 based on the determination of the presence of excessive residue across the forward portion of the field, for example, to reduce the speed of the vehicle 10 and implement 12 from a desired operating speed, where the ground engaging tool(s) are able to perform such that a desired amount of residue is left on the field after the ground engaging operation, to a reduced speed. By reducing the speed of at which the implement 12 is towed, the ground engaging tool(s) 46, 58, 52, 54 may not engage as much residue or as effectively, which may reduce the likelihood that the ground engaging tool(s) begins to accumulate residue. Such reduction in the speed of the ground engaging tool(s) may thus reduce the amount of residue incorporated into the field by the ground engaging tool(s) across the section of the field having excessive residue. The controller 202 may further be configured to control the operation of the vehicle drive component(s) 24, 26 to increase the speed of the vehicle 10 and implement 12 back from the reduced speed to the desired operating speed after working the section(s) of the field having excessive residue.

It should be appreciated that, depending on the type of controller 202 being used, the above-described control actions may be executed directly by the controller 202 or indirectly via communications with a separate controller. For instance, when the controller 202 corresponds to an implement controller of the implement 12, the controller 202 may be configured to execute the implement-related control actions directly while being configured to execute the vehicle-related control actions by transmitting suitable instructions or requests to a vehicle-based controller of the vehicle 10 towing the implement 12 (e.g., using an ISObus communications protocol). Similarly, when the controller 202 corresponds to a vehicle controller of the vehicle 10 towing the implement 12, the controller 202 may be configured to execute the vehicle-related control actions directly while being configured to execute the implement-related control actions by transmitting suitable instructions or requests to an implement-based controller of the implement 12 (e.g., using an ISObus communications protocol). In other embodiments, the controller 202 may be configured to execute both the implement-based control actions and the vehicle-based control actions directly or the controller 202 may be configured to execute both of such control action types indirectly via communications with a separate controller.

Further, in some embodiments, the controller 202 may perform the control action(s) described above after a time delay. For instance, there may be a period of time between when excessive residue is detected within the forward portion of the field, particularly a section of the field within the field(s) of view 106 of the residue sensor(s) 104, and when the implement 12 passes over the section of the field having the excessive residue. As such, the controller 202 may, thus, wait for a time delay to elapse before performing the control action(s) to minimize the amount of time that the ground engaging tools are operating at the adjusted (e.g., reduced) operating parameter(s). The time delay may be selected based on one or more of the speed of the implement 12, the distance between the field of view(s) 106 and the ground engaging tools of the implement 12, the amount of time it takes to adjust the operating parameters of the ground engaging tools, or the like.

Moreover, in some embodiments, the controller 202 may be configured to indicate areas within the field which may have reduced residue incorporation such that subsequent field operations may address such areas. For instance, in one embodiment, the controller 202 may be communicatively coupled to the positioning system 212 described above to monitor the current location of the implement 12 as it simultaneously monitors the amount of residue across the forward portion of the field. When it is detected that the forward portion of the field has excessive residue, or when the operating parameters of the ground engaging tools are adjusted based on the presence of excessive residue, the controller 202 may store the current field location of the implement 12 within its memory. The controller 202 may then create an alert or log of alerts to indicate to an operator the location(s) of areas within the field (e.g., section(s) of the field with excessive residue) that may have reduced residue incorporation, which may, for example, be displayed to the operator via the user interface 210 for performing subsequent or additional passes over such areas or adjusting the operation of ground engaging equipment during subsequent field operations. Alternatively, the alert or log of alerts may be used to automatically adjust autonomous programs for working the field.

Figure 4:
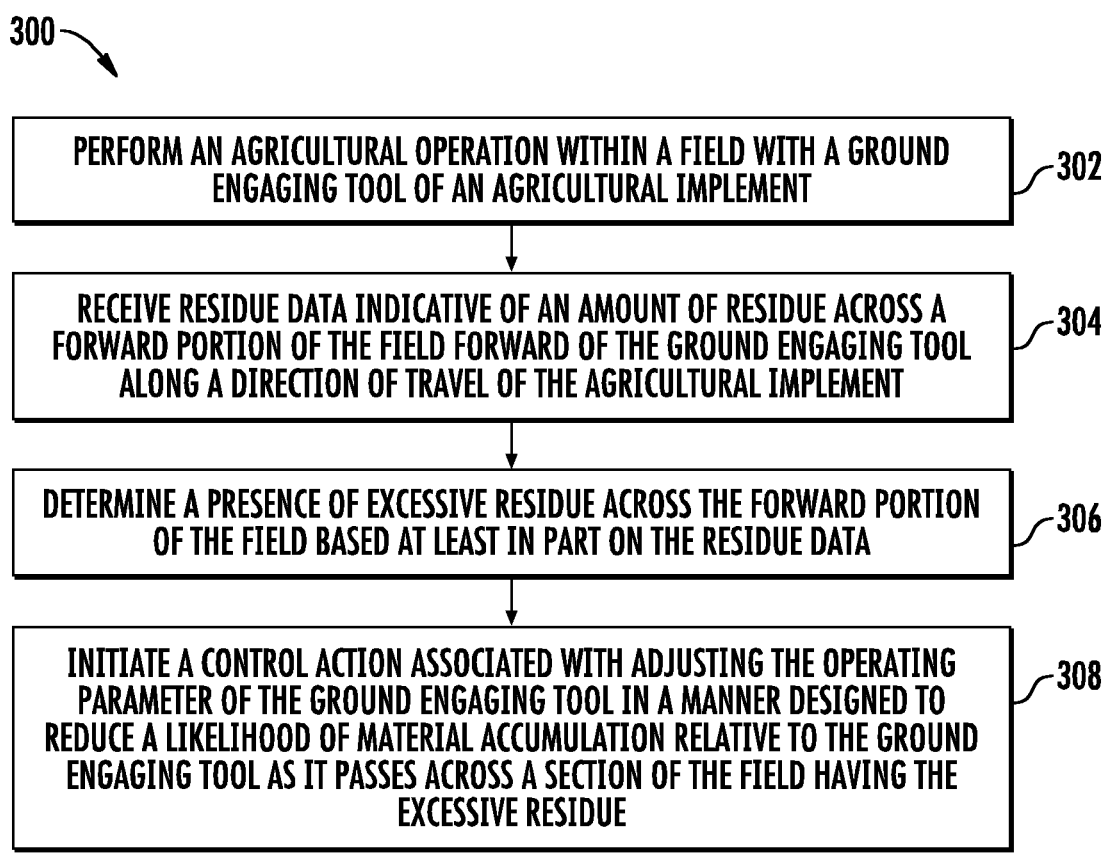
FIG. 4 illustrates a flow diagram of one embodiment of a method for preventing material accumulation relative to ground engaging tools of an agricultural implement in accordance with aspects of the present subject matter.

Referring now to FIG. 4, a flow diagram of one embodiment of a method 300 for preventing material accumulation relative to ground engaging tools of an agricultural implement is illustrated in accordance with aspects of the present subject matter. In general, the method 300 will be described herein with reference to the work vehicle 10 and the implement 12 shown in FIGS. 1 and 2, as well as the various system components shown in FIG. 3. However, it should be appreciated that the disclosed method 300 may be implemented with work vehicles and/or implements having any other suitable configurations and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 4, at (302), the method 300 may include performing an agricultural operation within a field with a ground engaging tool of an agricultural implement For example, as indicated above, the ground engaging tools of the implement 12 may be configured to engage the field as the implement 12 is towed across the field by the work vehicle 10 during an agricultural operation. In doing so, as described above, the ground engaging tools have operating parameters (e.g., penetration depth, engagement angle, speed, etc.) that, when varied, can affect the amount of residue that the ground engaging tool incorporates into the field during the agricultural operation.

Further, as shown at (304), the method 300 may include receiving residue data indicative of an amount of residue across a forward portion of the field forward of the ground engaging tool along a direction of travel of the agricultural implement. For instance, as indicated above, the controller 202 may receive residue data from a residue sensor(s) 104 and/or from a residue map generated during a previous agricultural operation corresponding to an amount of residue across a forward portion of the field forward of a ground engaging tool performing an agricultural operation.

Moreover, as shown at (306), the method 300 may include determining a presence of excessive residue across the forward portion of the field based at least in part on the residue data. For example, as indicated above, the controller 202 may, in one embodiment, determine the presence of excessive residue across the forward portion of the field when the percentage of residue coverage across the forward portion of the field exceeds a threshold residue percentage. In another embodiment, the controller 202 may determine the presence of excessive residue across the forward portion of the field when the height of the residue across the forward portion of the field exceeds a threshold height.

Additionally, as shown at (308), the method 300 may include initiating a control action associated with adjusting the operating parameter of the ground engaging tool in a manner designed to reduce a likelihood of material accumulation relative to the ground engaging tool as it passes across a section of the field having excessive residue. For instance, as indicated above, the controller 202 may be configured to control the operation of an actuator(s) 56, 58, 60, 62 of the implement 12 to adjust the penetration depth of the respective ground engaging tool(s) (e.g., shanks 46, disk gangs 48, leveling disks 52, basket assemblies 54) and/or an actuator(s) 64 of the implement 12 to adjust the engagement angle of the respective ground engaging tool(s) 48. Further, as indicated above, the controller 202 may be configured to control the operation of the vehicle drive component(s) 24, 26 of the work vehicle 10 to slow down the implement 10. Additionally, in some embodiments, the controller 202 may indicate to an operator of the presence of excessive residue across the forward portion of the field, e.g., by controlling the operation of the user interface 210.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for preventing material accumulation relative to an agricultural implement, the system comprising:
    a ground engaging tool supported on an agricultural implement, the ground engaging tool having an operating parameter that is adjustable to vary an amount of residue incorporated into a field by the ground engaging tool during the performance of an agricultural operation within the field;
    a residue sensor configured to generate residue data associated with of the amount of residue across the field; and
    a controller configured to:
        receive the residue data generated by the residue sensor;
        determine a presence of excessive residue across a forward portion of the field forward of the ground engaging tool along a direction of travel of the agricultural implement based at least in part on the residue data; and
        initiate a control action associated with adjusting the operating parameter of the ground engaging tool to incorporate less residue into the field by the ground engaging tool across a section of the field having excessive residue such that the amount of residue remaining on the field after the agricultural operation is higher than a desired amount of residue, the control action reducing a likelihood of material accumulation relative to the ground engaging tool as the ground engaging tool works the section of the field having excessive residue.

2. The system of claim 1, wherein the controller is configured to determine a percentage of residue coverage across the forward portion of the field based at least in part on the residue data.

3. The system of claim 2, wherein the controller is configured to determine the presence of excessive residue across the forward portion of the field when the percentage of residue coverage across the forward portion of the field exceeds a threshold residue percentage.

4. The system of claim 1, wherein the controller is configured to determine a height of the residue across the forward portion of the field based at least in part on the residue data.

5. The system of claim 4, wherein the controller is configured to determine the presence of excessive residue across the forward portion of the field when the height of the residue across the forward portion of the field exceeds a threshold height.

6. The system of claim 1, wherein the controller is configured to initiate the control action after a time delay, the time delay being selected such that the operating parameter is adjusted as the ground engaging tool is moved across the section of the field having excessive residue.

7. The system of claim 1, wherein the controller is configured to adjust the operating parameter of the ground engaging tool by at least one of:
reducing a penetration depth of the ground engaging tool;
decreasing a speed of the ground engaging tool; or
reducing an engagement angle of the ground engaging tool relative to the direction of travel of the agricultural implement.

8. The system of claim 1, wherein the residue sensor is supported on the agricultural implement and has a field of view directed towards the forward portion of the field.

9. The system of claim 1, wherein the residue data is received from a residue map based on a location of the agricultural implement within the field, the residue map being generated based at least in part on the residue data generated by the residue sensor during a previous field operation.

10. The system of claim 1, wherein the control action associated with adjusting the operating parameter of the ground engaging tool comprises adjusting the operating parameter of the ground engaging tool from a desired operating parameter setting associated with leaving the desired amount of residue on the field after the agricultural operation to a reduced operating parameter setting associated with leaving the amount of residue on the field after the agricultural operation that is higher than the desired amount of residue.

11. A method for preventing material accumulation relative to an agricultural implement, the method comprising:
performing an agricultural operation within a field with a ground engaging tool of an agricultural implement, the ground engaging tool having an operating parameter that is adjustable to vary an amount of residue incorporated into the field by the ground engaging tool during the agricultural operation;
receiving, with a computing device, residue data generated by a residue sensor, the residue data being indicative of an amount of residue across the field;
determining, with the computing device, a presence of excessive residue across a forward portion of the field forward of the ground engaging tool along a direction of travel of the agricultural implement based at least in part on the residue data; and
initiating, with the computing device, a control action associated with adjusting the operating parameter of the ground engaging tool to incorporate less residue into the field by the ground engaging tool across a section of the field having excessive residue such that the amount of residue remaining on the field after the agricultural operation is higher than a desired amount of residue, the control action reducing a likelihood of material accumulation relative to the ground engaging tool as the ground engaging tool works the section of the field having excessive residue.

12. The method of claim 11, further comprising determining a percentage of residue coverage across the forward portion of the field based at least in part on the residue data and comparing the percentage of residue coverage across the forward portion of the field to a threshold residue percentage.

13. The method of claim 12, wherein determining the presence of excessive residue across the forward portion of the field comprises determining the presence of excessive residue across the forward portion of the field when the percentage of residue coverage exceeds the threshold residue percentage.

14. The method of claim 11, further comprising determining a height of the residue across the forward portion of the field based at least in part on the residue data and comparing the height of the residue to a threshold height.

15. The method of claim 14, wherein determining the presence of excessive residue across the forward portion of the field comprises determining the presence of excessive residue across the forward portion of the field when the height of the residue exceeds the threshold height.

16. The method of claim 11, further comprising indicating that the section of the field having excessive residue has reduced residue incorporation.

17. The method of claim 11, wherein initiating the control action associated with adjusting an operating parameter of the ground engaging tool comprises reducing a penetration depth of the ground engaging tool.

18. The method of claim 11, wherein initiating the control action associated with adjusting an operating parameter of the ground engaging tool comprises increasing a speed of the agricultural implement.

19. The method of claim 11, wherein initiating the control action associated with adjusting an operating parameter of the ground engaging tool comprises reducing an engagement angle of the ground engaging tool relative to the direction of travel of the agricultural implement.

20. The method of claim 11, wherein initiating the control action comprises adjusting the operating parameter of the ground engaging tool from a desired operating parameter setting associated with leaving the desired amount of residue on the field after the agricultural operation to a reduced operating parameter setting associated with leaving the amount of residue on the field after the agricultural operation that is higher than the desired amount of residue.

* * * * *